US010825310B2

(12) United States Patent
Script

(10) Patent No.: US 10,825,310 B2
(45) Date of Patent: *Nov. 3, 2020

(54) 3D MONITORING OF SENSORS PHYSICAL LOCATION IN A REDUCED BANDWIDTH PLATFORM

(71) Applicant: Michael Script, Fairfax, VA (US)

(72) Inventor: Michael Script, Fairfax, VA (US)

(73) Assignee: VCLICK3D, INC., Fairfax Station, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/180,950

(22) Filed: Nov. 5, 2018

(65) Prior Publication Data

US 2019/0180586 A1 Jun. 13, 2019

Related U.S. Application Data

(63) Continuation-in-part of application No. 14/996,302, filed on Jan. 15, 2016, now Pat. No. 10,121,080.
(Continued)

(51) Int. Cl.
*G08B 13/196* (2006.01)
*H04N 13/271* (2018.01)
(Continued)

(52) U.S. Cl.
CPC ... *G08B 13/19665* (2013.01); *G06K 9/00771* (2013.01); *G06K 9/00778* (2013.01);
(Continued)

(58) Field of Classification Search
CPC ...... H04N 5/232; H04N 5/33; G06K 9/00771; G06K 9/00288
See application file for complete search history.

(56) References Cited

U.S. PATENT DOCUMENTS

| 2006/0008151 | A1* | 1/2006 | Lin | G06K 9/48 |
| | | | | 382/190 |
| 2010/0124274 | A1* | 5/2010 | Cheok | G04N 19/176 |
| | | | | 375/240.03 |

(Continued)

*Primary Examiner* — Tsion B Owens
(74) *Attorney, Agent, or Firm* — Sulhane Meadows PLLC; Robert C. Klinger

(57) ABSTRACT

Systems and methods for controlling the recording, storing and transmitting of video content captured by security cameras in order to drastically reduce the overall bandwidth required to remotely monitor a physical space. More specifically, embodiments of the present invention relate to a method of triggering or activating a video camera to record and/or transmit images of a physical environment over a network only when measurements taken by a separate structural sensor camera or depth-sensing device indicate that sufficient physical changes have occurred in the environment to warrant video recording. Embodiments of the invention pair video cameras with structural depth sensors, along with enhanced on-board processing techniques, to increase the recording and transmitting efficiency of video cameras by recording and/or transmitting video streams only when something in the physical environment monitored by a depth sensor is determined to have changed or moved, or is determined by processing algorithms to be important or significant. A security function and a library of image processing analytics are also disclosed for processing static and dynamic image states within the measured physical space.

1 Claim, 12 Drawing Sheets

Related U.S. Application Data

(60) Provisional application No. 62/103,717, filed on Jan. 15, 2015, provisional application No. 62/131,559, filed on Mar. 11, 2015, provisional application No. 62/200,465, filed on Aug. 3, 2015.

(51) Int. Cl.
  *G06T 7/50* (2017.01)
  *G06K 9/00* (2006.01)
  *G06T 7/254* (2017.01)

(52) U.S. Cl.
  CPC ................ *G06T 7/254* (2017.01); *G06T 7/50* (2017.01); *G08B 13/19667* (2013.01); *G08B 13/19669* (2013.01); *H04N 13/271* (2018.05); *G06K 9/00288* (2013.01); *G06T 2200/04* (2013.01); *G06T 2207/10016* (2013.01); *G06T 2207/10028* (2013.01); *G06T 2207/30232* (2013.01)

(56) References Cited

U.S. PATENT DOCUMENTS

| | | | |
|---|---|---|---|
| 2011/0175999 A1* | 7/2011 | McCormack | H04N 5/23203 348/143 |
| 2011/0178967 A1* | 7/2011 | Delp | G05B 23/0229 706/20 |
| 2012/0063641 A1* | 3/2012 | Venkatesh | G06K 9/00771 382/103 |
| 2012/0086780 A1* | 4/2012 | Sharma | G06K 9/00771 348/46 |
| 2012/0275755 A1* | 11/2012 | Southworth | G06T 19/006 386/200 |
| 2016/0275766 A1* | 9/2016 | Venetianer | G06K 9/00771 |

* cited by examiner

| SAE LEVEL | SAE NAME | SAE NARRATIVE DEFINITION |
|---|---|---|
| colspan=3 | HUMAN DRIVER MONITORS THE DRIVING ENVIRONMENT | |
| 0 | NO AUTOMATION | THE FULL-TIME PERFORMANCE BY THE HUMAN DRIVER OF ALL ASPECTS OF ALL ASPECTS OF THE DYNAMIC DRIVING TASK |
| 1 | DRIVER ASSISTANCE | THE DRIVING MODE-SPECIFIC EXECUTION BY A DRIVER ASSISTANCE SYSTEM OF EITHER STEERING OR ACCELERATION / DECELERATION |
| 2 | PARTIAL AUTOMATION | PART-TIME OR DRIVING MODE DEPENDENT EXECUTION BY ONE OR MORE DRIVER ASSISTANCE SYSTEMS OF BOTH STEERING AND ACCELERATION / DECELERATION. HUMAN DRIVER PERFORMS ALL OTHER ASPECTS OF THE DYNAMIC DRIVING TASK |
| colspan=3 | AUTOMATED DRIVING ("SYSTEM") MONITORS THE DRIVING ENVIRONMENT | |
| 3 | CONDITIONAL AUTOMATION | DRIVING MODE-SPECIFIC PERFORMANCE BY AN AUTOMATED DRIVING SYSTEM OF ALL ASPECTS OF THE DYNAMIC DRIVING TASK - HUMAN DRIVER DOES RESPOND APPROPRIATELY TO A REQUEST TO INTERVENE |
| 4 | HIGH AUTOMATION | DRIVING MODE-SPECIFIC PERFORMANCE BY AN AUTOMATED DRIVING SYSTEM OF ALL ASPECTS OF THE DYNAMIC DRIVING TASK - HUMAN DRIVER DOES NOT RESPOND APPROPRIATELY TO A |
| 5 | FULL AUTOMATION | FULL-TIME PERFORMANCE BY AN AUTOMATED DRIVING SYSTEM OF ALL ASPECTS OF THE DYNAMIC DRIVING TASK UNDER ALL ROADWAY AND ENVIRONMENTAL CONDITIONS THAT CAN BE MANAGED BY A |

| Roadway Device | Autonomous Vehicle | Traffic Control |
|---|---|---|
| Lamp Post Pole<br>    Illumination<br>    Wired Power<br>    Wired Data Line (Opt).<br>Video Surveillance Camera<br>Structure Sensor<br>    Depth Sensing<br>    LIDAR<br>    Radar<br>    Thermal Imaging<br>    Stereo Video<br>Sound Sensor<br>Environmental Sensor<br>    Light<br>    Gas<br>    Etc.<br>Storage<br>Battery Backup<br>Network Connection<br>    Wired<br>    Wireless<br>GPU Processor<br>CPU Processor<br>Video (Encode/Decode)<br>Memory<br>Display DSI,DP,HDMI,eDP<br>CSI<br>PCIE (eMMC,SDIO,SATA)<br>MISC.<br>(CAN,UART,SPI,I2C,I2S,GPIOs)<br>USB<br>Mechanical Connections | Autonomous Vehicle (AV)<br>Automated Driving System (ADS)<br>Unmanned Vehicle<br>    UAV/UAS/UGV/UUV<br><br>Level 0: Driver Only<br>Level 1: Assisted Driving<br>Level 2: Partial Automation<br>Level 3: Conditional Automation<br>Level 4: High Automation<br>Level 5: Full Automation | Automated/Manned<br>Monitoring<br>    Vehicles<br>    Lamp Posts<br>    Environmental Systems<br>    Driving Conditions |

FIGURE 10

3D MONITORING OF SENSORS PHYSICAL LOCATION IN A REDUCED BANDWIDTH PLATFORM

CROSS-REFERENCE TO RELATED APPLICATIONS

This application is a Continuation-in-Part of U.S. Ser. No. 14/996,302 filed Jan. 15, 2016 entitled "Systems and Methods for Controlling the Recording, Storing and Transmitting of Video Surveillance Content", which claims priority under 35 U.S.C. § 119(e) to U.S. Provisional Patent Application No. 62/103,717, entitled "Controlling Visual Space Through a Physically Measured Environment System," filed Jan. 15, 2015. This application also claims priority under 35 U.S.C. § 119(e) to U. S. Provisional Patent Application No. 62/131,559, entitled "Controlling Visual Space Through a Physically Measured Environment System," filed Mar. 11, 2015. This application also claims priority under 35 U.S.C. § 119(e) to U.S. Provisional Patent Application No. 62/200,465, entitled "Controlling Visual Space Through a Physically Measured Environment System," filed. Aug. 3, 2015.

FIELD OF THE DISCLOSURE

Embodiments of the present disclosure relate to a new methods of controlling the recording, storing and transmitting of video content captured by security cameras. More specifically, embodiments of the present disclosure relate to a method of triggering a video camera to record and/or transmit images of an environment over a network only when measurements taken by a separate structural sensor or depth camera indicate that sufficient physical changes have occurred in the environment to warrant recording.

BACKGROUND

Various techniques are known for compressing video streams to reduce bandwidth and storage requirements. Examples of known video compression algorithms include H.264/H.265, JPEG, AVI, AAC, MP4/MPEG-4 Part 10, FLV, RealMedia, Matroska, and Advanced Video Coding (MPEG-4 AVC). To achieve compression, a video stream is typically encoded, transmitted over a network or other similar transmission medium and then decoded when it is received. To maintain a high rate of loss-less compression, the encoder and decoder typically begin with a reference frame and then to construct the original video stream, compress it, distribute it, and finally reconstruct it. In security applications, various algorithms are employed to segregate areas of video in order to monitor pixel change states in those areas. Libraries of algorithms for identifying and/or monitoring pixel change states are common in the industry. Software applications that analyze video streams for security purposes are also very well known in the industry.

Also commonly known are apparatuses for creating data indicating distances to objects in a scene. Such products typically comprise a radiation source and modulator, optics for receiving and collimating the radiation reflected from the scene, a detector for converting the received radiation into digital data, and a processor for processing the digital data. Upon receiving the digital data, the processor typically forms an image having an intensity value distribution indicative of the distance of objects form the apparatus. Such products are available on the market today include Occipital, Inc.'s Structure Camera, Panasonic's Structure Camera, Microsoft's Kinect, and other similar products.

SUMMARY OF THE INVENTION

This summary is provided to introduce certain concepts in a simplified form that are further described below in the Detailed Description. This summary is not intended to identify key features or essential features of the claimed subject matter, nor is it intended to limit in any way the scope of the claimed disclosure.

Embodiments of the present disclosure relate to systems and methods for controlling the recording, storing and transmitting of video content captured by security cameras in order to drastically reduce the overall bandwidth required to remotely monitor a physical space. More specifically, embodiments of the present disclosure relate to a method of triggering or activating a video camera to record and/or transmit images of a physical environment only when measurements taken by a separate structural sensor camera or depth-sensing device indicate that sufficient physical changes have occurred in the environment to warrant video recording. Embodiments of the disclosure pair video cameras with structural sensor cameras or depth sensors, along with enhanced on-board processing techniques, to increase the recording and transmitting efficiency of video cameras by recording and/or transmitting video streams of a physical environment only when something in the physical environment monitored by the structural camera is determined to have changed or moved, or is determined by processing algorithms to be important or significant. Evidentiary data can be collected from both the video camera and the structural sensors/cameras to increase the evidence of an event scene within the surveyed physical environment. A security function, including matching the structural sensors/cameras and video surveillance camera to the scene being visually surveyed, and a library of image processing analytics are also disclosed for processing static and dynamic image states within the measured physical space. Audio capture is also contemplated as part of video recording.

BRIEF DESCRIPTION OF THE DRAWINGS

So the manner in which the above recited summary of the present disclosure can be understood in detail, a more particular description of the invention may be had by reference to embodiments, some of which are illustrated in the appended drawings. It is to be noted, however, that the appended drawings illustrate only example embodiments of this disclosure and are therefore not to be considered limiting of its scope, for the disclosure may admit to other equally effective embodiments.

FIG. 9 and FIG. 10 illustrate automation levels of autonomous cars.

DESCRIPTION OF THE EMBODIMENTS

Figure 1:
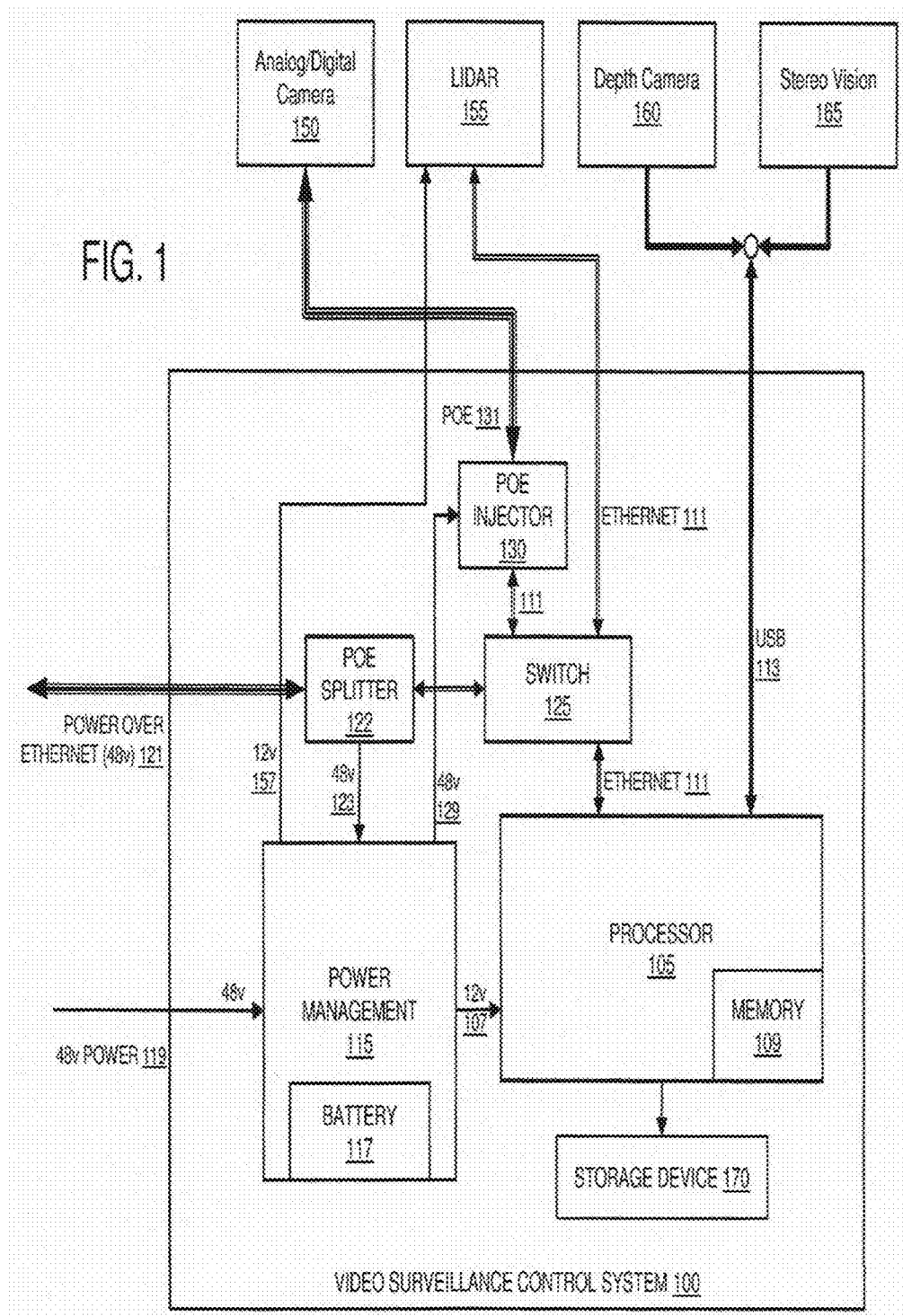
FIG. 1 illustrates an exemplary block diagram of a hardware architecture corresponding to an embodiment of a video surveillance control system, in accordance with the present disclosure.

Embodiments of the present disclosure will be described with reference to the accompanying drawings, wherein like parts are designated by like reference numerals throughout, and wherein the leftmost digit of each reference number refers to the drawing number of the figure in which the referenced part first appears.

As summarized above, embodiments of the present disclosure provide systems and methods for activating a video camera to record images of an environment only when measurements taken by a separate structural sensor camera or depth-sensing device indicate that sufficient physical changes have occurred in the environment to warrant video recording. Other embodiments are also disclosed that provide additional image processing analytics and related functions.

Hardware Architecture

FIG. 1 illustrates an exemplary block diagram of a hardware architecture corresponding to an embodiment of a video surveillance control system 200, in accordance with the present disclosure. The system 100 may comprise a Processor 105 that is connected via communication channels such as Ethernet 111 and/or USB 113 to an Analog/Digital Camera 150 and at least one type of structural sensor camera or depth-sensing device, including for example, a LIDAR Camera 155, a Depth Camera 160, and/or a Stereo Vision Camera 165. Processor 105 may comprise a Computing Device 500 such as that illustrated in FIG. 5 (further described below). Processor 105 may also comprise a computing device such as a Tegra K1/X1 processor from NVIDIA, or equivalent (for example, a Jetson TK1 or Jetson TX1). Processor 105 may include a combination of processing units, including Central Processing Units ("CPUs") and Graphics Processing Units ("GPUs") (not shown), memory units such as Memory 109. Each of the memory units may comprise any number of different physical memory devices or they together may comprise a single memory device. Each of the memory units may comprise a shared memory. Processor 105 may be connected to a storage device such as Storage Device 170. Storage Device 170 may comprise any number of storage devices known in the art for storing computer data and/or video information. Storage Device 170 may, for example, include a traditional computer disk drive or equivalent device. Storage Device 170 may also, for example, include a Digital Video Recorder ("DVR") or Network Video Recorder ("NVR").

Examples of Analog/Digital Camera 150 include from Pelco: C20, BU, FD, Spectra; from Samsung: Box, Bullet, Fixed Dome, PTZ (Pan Tilt Zoom), UTP (Unshielded Twisted Pair); Axis, Avigilon, Dahua, Hikvision, Sony, Panasonic, ACTi, Arecont Vision, Bosch, Canon, Cisco, D-Link, Extreme, GE, Honeywell, ioimage, IQInvision, JVC, Linksys, Logitech, Lumenera, Merit LILIN, MOBOTIX, Qorvus, Smartvue, StarDot, Synology, Tamron, Toshiba, TRENDNet, Tyco, Verix, VideoIQ and Vivotek.

Examples of a Stereo Vision Camera 165 include Point Grey and Ensenso. A Stereo Vision Camera 165 is a set of two, traditional cameras, paired together, so that they can work together just like human eyes do.

Examples of a Depth Camera 160 include Occipital, Microsoft Kinect, IDS, CCTVSTAR, SICK, PILZ, OPTO-MOTIVE, Point Grey, and Ensenso. Depth cameras actively emit light in either a known pattern, referred to as structured light, or they emit flashes of light in a known interval; they then analyze how the emitted light interacts with the environment to measure the depth of the environment. Structured light cameras use a known pattern of light and an offset camera to observe the deformation of the known light pattern; by analyzing that deformation, they can measure the depth between the camera and every single point in the environment. These cameras usually have onboard controllers to look at the video stream, look at what the known pattern is, and combine this information into a depth map of the environment that can give a depth for every point in an image as well as the depth from the camera to that point. This calculation of depth can happen on the depth camera itself. The cameras can have a light emitting portion and a receiving portion, allowing the controller to receive a processed version of the signal after the depth camera has analyzed the input and created its depth map.

An example of a LIDAR Camera 155 is a Velodyne PUCK A LIDAR (also LiDAR or LADAR) camera is similar to a structured light depth camera except, instead of having an image sensor, it can project a single point of light through the environment and measures the time it takes for that point to return. LIDAR devices are usually on a mirror, or some kind of rotating device, allowing the device to sweep the point of light through the environment and generate millions of points per second of high-accuracy measurements of the environment. The output of a LIDAR device usually takes the form of a point cloud, which is a list of all the points that the device measured, in xyz positions, in meters relative to the sensor. All of the data processing, done to generate a point cloud, can be done on the LIDAR device. The environmental data and the point cloud output that the LIDAR device measures and creates can all be sent to the controller.

Video surveillance control system 100 may receive electrical power from any number of external sources. For example, as shown in FIG. 1, video surveillance control system 100 may receive external power through a 48-volt Power Line 119. Power Line 119 may be routed to Power Management Unit 115, which may then subdivide the received 48-volt power into other voltages for distribution to other components. For example, Power Management Unit 115 may provide 12-volt power to Processor 105 via 12-volt Power Line 107. Similarly, Power Management Unit 115 may provide 12-volt power to LIDAR Camera 155 via 12-volt Power Line 157. Power Management Unit 115 may also provide 48-volt power to certain other components. For example, Power Management Unit 115 may provide 48-volt power to Power-Over-Ethernet ("POE") Injector 130 via 48-volt line 129. POE Injector 130 may then inject Ethernet 111 with 48-volts of power for use by components such as Analog/Digital Camera 150 via POE 131. As known in the art, specific voltage requirements may vary for each component. One skilled in the art will be able to design circuits to distribute required power levels to desired components. The specific power distributions, as well as specific network protocols shown in FIG. 1 are merely examples.

As another example, video surveillance control system 100 may receive external power through a Power-Over-Ethernet Line 121. In this configuration, the Ethernet Line 121 may be connected to a Power-Over-Ethernet Splitter 122, which may then provide a direct 48-volt Power Line 123 to Power Management Unit 115, in the same manner as 48-volt Power Line 119. After Power-Over-Ethernet Splitter 122 has separated 48-volt power from the Power-Over-Ethernet Line 121, POE Splitter 122 may provide a standard Ethernet connection to an Ethernet Switch 125, which may enable Processor 105 to communicate with external devices (not shown), to communicate with Ethernet-enabled devices, such as Analog/Digital Camera 150 and/or LIDAR Camera 155, and to communicate with USB-enabled devices, such as Depth Camera 160 and/or Stereo Vision Camera 165.

Processor 105 may communicate with internal and external devices, including Analog/Digital Camera 150, LIDAR Camera 155, Depth Camera 160, and/or Stereo Vision Camera 165, via Ethernet 111, Power-Over-Ethernet 121, Power-Over-Ethernet 131, USB 113, or any similar communication network. Processor 105 may also communicate with external devices (for example, user devices, including Control/View Terminal 210, Storage Device 270, and Network 265, all shown in FIG. 2) via Power-Over-Ethernet 121 or any other network connection and/or protocol known in the art, including wireless protocols and wireless devices.

Software Architecture

Figure 2:
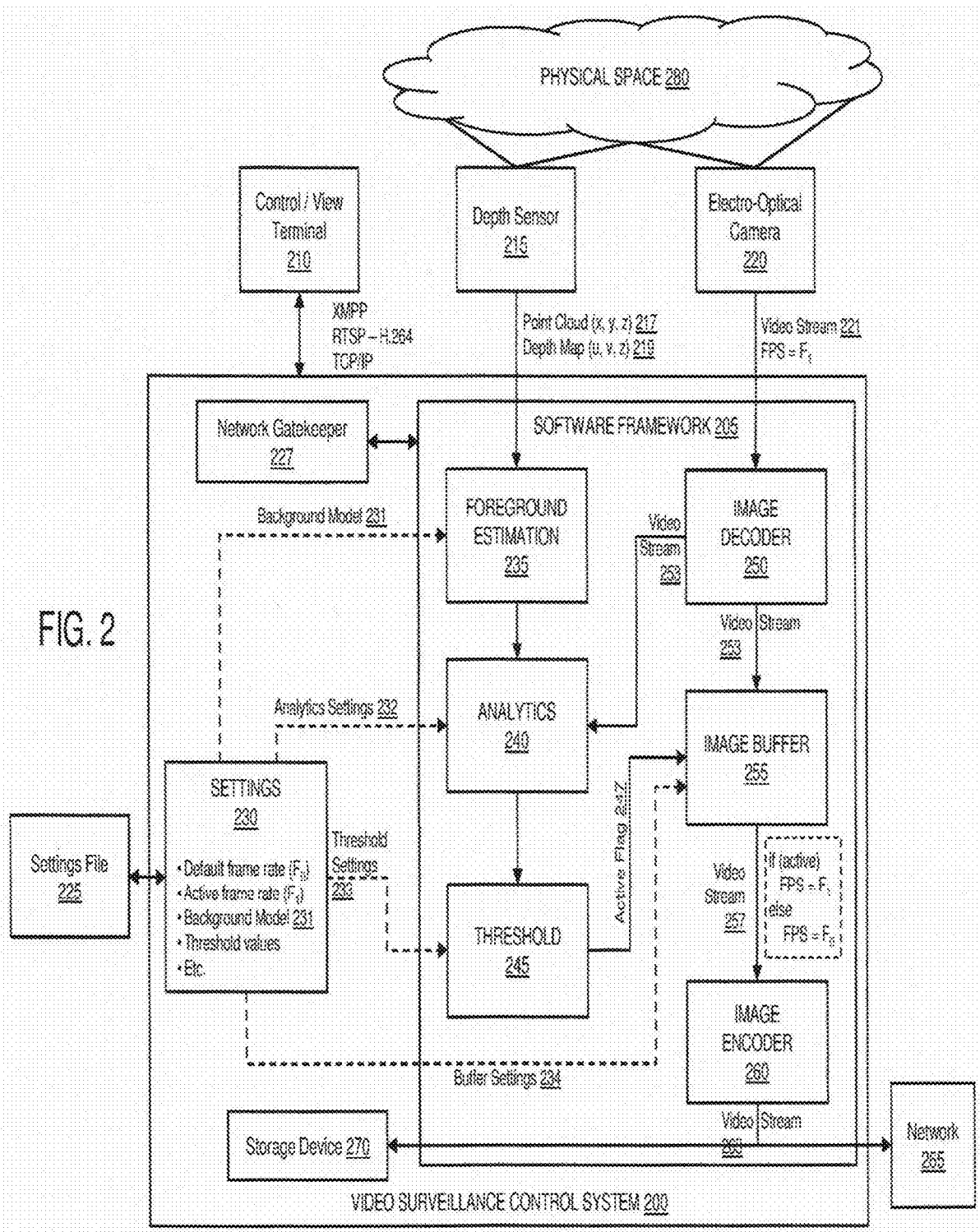
FIG. 2 illustrates an exemplary block diagram of a software architecture corresponding to an embodiment of a video surveillance control system, in accordance with the present disclosure.

FIG. 2 illustrates an exemplary block diagram of a software architecture corresponding to an embodiment of a video surveillance control system 200, in accordance with the present disclosure. Video surveillance control system 200 shown in FIG. 2 may correspond to the same video surveillance control system 100 that is shown in FIG. 1. As discussed with respect to video surveillance control system 100, video surveillance control system 200 may execute on a Processor 105 such as a Tegra K1/X1 processor from NVIDIA, or equivalent. Processor 105 may be configured to run an operating system such as Linux, or any equivalent operating system known in the art that is capable of supporting the described features of the embodiments.

Processor 105 may also be configured with a video processing Software Framework 205 for piecing together different building blocks for developing 2D and 3D computer vision processing pipelines. The video processing software framework may encompass, for example, decompression of video streams, processing of those video streams, feature extraction, video and/or image analytics, video and/or image compression, and transmission of video streams over a network to receivers. Software Framework 205 may provide a software foundation upon which the following processing modules may operate: Foreground Estimation Module 235, Analytics Module 240, Threshold Module 245, Image Decoder Module 250, Image Buffer Module 255, and Image Encoder 260. In addition to using the Software Framework 205, these video processing modules (235, 240, 245, 250, 255 and 260) may also employ NVIDIA CUDA software, which is a parallel computing software architecture known in the art and available on NVIDIA processors such as the Tegra K1/X1 processor.

Video surveillance control system 200 may be configured to monitor a given Physical Space 280 and to determine when it is appropriate to record and/or transmit images of Physical Space 280 to an external user. Typical videographic images of Physical Space 280 may be captured by Electro-Optical Camera 220, which may transmit its received images to Image Decoder Module 250 of video surveillance control system 200 using a format such as H.264 or MPEG-4 Part 10 Advanced Video Coding, at an active frame rate of $F_1$ frames per second ("FPS"), where $F_1$ may be a configurable setting as explained below.

Video surveillance control system 200 may interface with a Settings File 225 and a Control/View Terminal 210. Settings File 225 may correspond to a typical software settings file or similar mechanisms known in the art for storing software settings and configuration parameters. As shown in FIG. 1, video surveillance control system 200 may read the values stored in Settings File 225 in order to instantiate Settings 230, which may correspond to an in-memory data structure for storing various settings and parameters relating to the functionality and operation of executing software within video surveillance control system 200. For example, as shown in FIG. 1, Settings 230 may store a default frame rate ($F_0$), an active frame rate ($F_1$), a Background Model 231 that was created during an initial configuration operation, threshold values, buffer settings, and other configuration parameters known in the art.

The default frame rate ($F_0$) is the rate at which images received by Electro-Optical Camera 220 are to be transmitted to a receiver when video surveillance control system 200 determines that nothing has occurred within Physical Space 280 to warrant transmitting real time video images at an active frame rate ($F_1$). The default frame rate ($F_0$), sometimes referred tows a "stay alive" or "still alive" transmission, may be set to one frame per second, for example, but other frame rates are possible, such as one frame per minute, one frame per 10 minutes, etc. This is a user-configurable value, which may be stored in Settings File 225 and read into Settings 230 during initialization. In some embodiments, a default frame rate $F_0$ may not be necessary or may be set to zero. In this configuration, video streams can simply be transmitted (for example, at the active frame rate $F_1$) or not.

The active frame rate ($F_1$) is the rate at which images received by Electro-Optical Camera 220 are to be transmitted to a receiver when video surveillance control system 200 determines that something has occurred within Physical Space 280 to warrant transmitting real time video images at an active frame rate ($F_1$). The active frame rate ($F_1$) may be set to 30 frames per second or 60 frames per second, for example, but other frame rates are possible, such as 15 frames per second or 120 frames per second. This is a user-configurable value, which may be stored in Settings File 225 and read into Settings 230 during initialization.

Control/View Terminal 210 may correspond to a terminal interface that a user may employ to interact with video surveillance control system 200. Control/View Terminal 210 may use a variety of interface protocols to communicate with video surveillance control system 200, including Extensible Messaging and Presence Protocol ("XMPP"), which is a communications protocol for message-oriented middleware based on XML, the Real Time Streaming Protocol ("RTSP") including H.264 for transmitting video content, and the Transmission Control Protocol ("TCP") and/or Internet Protocol ("IP") (collectively, "TCP/IP"). Using the Control/View Terminal 210, users may change configuration values stored in Settings 230, manually, activate and/or deactivate various features of the system, and view images of the Physical Space 280, such views including point clouds and/or depth maps comprising the Background Model 231.

Users may also use the Control/View Terminal 210 to view point clouds and/or depth maps comprising the'Foreground Models developed by the Foreground Estimation Module 235, and to view Video Stream 253 produced by the Image Decoder Module 250, Video Stream 257 produced by Image Buffer Module 255, and/or Video Stream 263 produced by Image Encoder Module 260.

Video surveillance control system 200 may use a Depth Sensor 215 to measure the physical, features and/or objects in Physical Space 280. Examples of Depth Sensor 215 include LIDAR Camera 155 (such as provided by Velodyne), Depth Camera 160 (such as Microsoft Kinect), and/or Stereo Vision Camera 165, all of which are shown in FIG. 1. Depth Sensor 215 may use active or passive sensing technology. Depth Sensors 215 using active technology may project'a signal pattern into Physical Space 280 or may scan the Physical Space 280 with a signal and then receive a returned signal from which a coordinate map of Physical Space 280 can be generated. That is, based on the returned signal(s), the coordinates (e.g., locations, shapes, sizes, and/or distances) of objects in Physical Space 280 can be calculated or determined. Depth Sensors 215 using passive technology may receive signals generated by other energy sources to generate a coordinate map of Physical Space 280. Depth Sensor 215 (regardless of whether it uses active or passive technology) may create a series of (x, y, z) data points commonly called a point cloud, or a series of (u, v, z) data points commonly called a depth map, where each data point (in the point cloud or the depth map) can correspond to a measured location within a desired portion of Physical Space 280 at a given resolution. Some Depth Sensors 215 may create a series of z data points (for a fixed u, v space corresponding to the resolution of the Depth Sensor 215), from which a depth map and/or a point cloud may be created.

During a configuration step, which may optionally be initiated and/or managed by a user via the Control/View Terminal 210, Depth Sensor 215 may be employed to create a Background Model 231 of Physical Space 280 from either a point cloud or a depth map. Background Model 231 may comprise a point cloud of (x, y, z) points or their equivalent and may correspond to the raw, empty, or default state of Physical Space 280. That is, Background Model 231 may record the locations and measurements of walls, corridors, floors, ceilings, stationary objects and other relatively fixed structures of Physical Space 280. Background Model 231 may be saved in Settings File 225, and may later be retrieved into Software Settings 230 as part of a subsequent initialization or restart of video surveillance control system 200.

Also during configuration, the video surveillance control system 200 can determine appropriate threshold values in order to identify changes from the Background Model 231. For example, video surveillance control system 200 may determine a threshold value based on the mean and the variance of Hu Moments statistics of the Background Model 231. In addition to the mean and variance of these statistics, video surveillance control system 200 can evaluate and take into account the "sensor noise" of the Depth Sensor 215. This means that video surveillance control system 200 can determine what the noise level of the Depth Sensor 215 and adjust the relevant threshold values to somewhere above the sensor noise level. Taking sensor noise into account while calculating a threshold value ensures that, when the controller determines a change has occurred, the user knows that the determination is a valid signal, that that signal represents something that is actually moving, and that the signal is not the result of noise chatter from the environmental monitoring devices.

After configuration and creation of Background Model 231 and during normal operation of video surveillance control system 200, Depth Sensor 215 may be further employed to measure Physical Space 280 in order to create a new point cloud or depth map of Physical Space 280. Such newly created point clouds and/or depth maps may be provided to a Foreground Estimation Module 235 at predetermined intervals. Using Background Model 231 created during initial configuration, Foreground Estimation Module 235 may then compare each newly created point cloud and/or depth map with the Background Model 231 to create a new Foreground Estimate Point Cloud 340 comprising data points describing objects in Physical Space 280 that are not found in the Background Model 231. Foreground Estimate Point Cloud 340 may be provided to an Analytics Module 240 for further processing and/or analysis.

Figure 3:
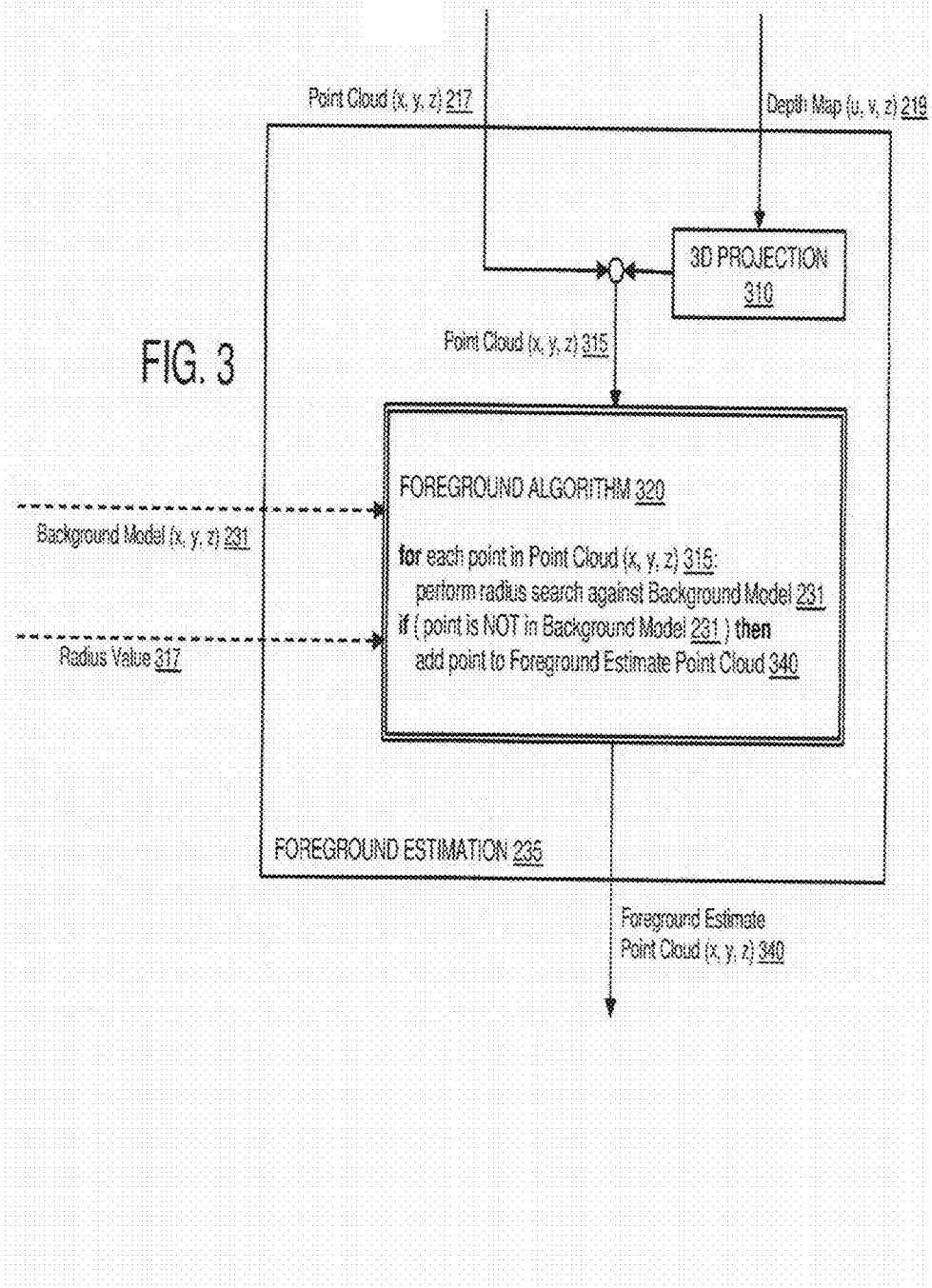
FIG. 3 illustrates an exemplary flow chart of an algorithm for processing point clouds to identify new objects in a physical space, according to an embodiment of the present disclosure.

FIG. 3 illustrates an exemplary flow chart of an algorithm in a Foreground Estimation Module 235 for processing point clouds to identify new objects that may have appeared in a physical space such as Physical Space 280, according to an embodiment of video surveillance control system 200. Foreground Estimation Module 235 may receive a As mentioned above, Background Model 231 may comprise a point cloud of (x, y, z) or equivalent, describing the raw, empty, or default structure of Physical Space 280. Foreground Estimation Module 235 may also receive a set of default settings for use in a Foreground Estimation Algorithm 320. The default settings may include, for example, a specified radius value for determining whether a given point in a received point cloud is sufficiently close to (i.e., with a certain radius distance of) a corresponding point in the Background Model 231. When Foreground Estimation Module 235 is invoked, it may receive a new point cloud 217 or a new depth map 219 from Depth Sensor 215. For convenience (so that Foreground Estimation Algorithm 320 may operate on a single data format), 3D Projection Module 310 may convert a newly received depth map 219 into a point cloud 315. If instead, Depth Sensor 215 provides a new point cloud 217, it may be forwarded to Foreground Estimation Algorithm 320 as point cloud 315.

Foreground Estimation Algorithm 320 may determine whether any of the points in point cloud 315 are part of the Background Model 231 or whether they should be considered part of a new object that has appeared in the Physical Space 280. Using the radius value described above, Foreground Estimation Algorithm 320 searches the Background Model 231 for points (i.e., nearby neighbors) that are within the defined radius distance of each point in point cloud 315. If no point in the Background Model 231 is found to be within a radius distance of a given point in point cloud 315, that point is added to the Foreground Estimate Point Cloud 340 as potentially being part of a new object. When the Foreground Estimation Algorithm 320 concludes, Foreground Estimate Point Cloud 340 is provided to the Analytics Module 240 (shown in FIG. 2).

Foreground Estimation Algorithm 320 is one example of a number of different algorithms known in the art for determining whether a given point or set of points (i.e., coordinate locations) belongs to or may be contained within a previously identified object or set of objects.

Further, unlike typical motion sensors, a slow moving object does not fool a depth sensor such as Depth Sensor 215. Therefore, embodiments of the invention can compare current depth measurements of an environment to the depth measurements of what the environment is supposed to be (for example the Background Model 231). It does not matter how slow an object is moving; if it is not supposed to be in the Physical Space 280, embodiments of the invention can find it and trigger the transmission of a video stream containing it, assuming the relevant threshold value is met (as discussed below with respect to FIG. 4).

Returning to FIG. 2, Image Decoder Module 250 may receive a real time video stream 221 from Electro-Optical Camera 220. Video Stream 221 may be in H.264 format, or any other comparable video format known in the art. Video Stream 221 may typically comprise a stream of real-time images at the active frame rate $F_1$. Image Decoder Module 250 may then decode Video Stream 221 and produce a raw Video Stream 253 (also at active frame rate $F_1$) for subsequent use by other modules in the video surveillance control system 200. For example, Analytics Module 240 may receive raw Video Stream 253 in order to perform facial recognition algorithms to assign unique identifiers to each recognized face.

Image Decoder Module 250 may also provide raw Video Stream 253 to Image Buffer Module 255. Image Buffer Module 255 may comprise a circular image buffer and related buffer management software. The size of the circular image buffer (e.g., the maximum number of images it can accommodate before overwriting previously stored images), as well as other Buffer Settings 234, may be read from Software Settings 230 and provided to Image Buffer Module 255 during software initialization.

Image Buffer Module 255 may typically receive video images from Image Decoder Module 250 in real time at active frame rate $F_1$, via raw Video Stream 253. Each of the received video images may be recorded in the circular image buffer maintained by Image Buffer Module 255, where the most recently received image may overwrite the least recently received image. As mentioned above, Image Buffer Module 255 may transmit/forward the contents of the circular image buffer to Image Encoder Module 260 via Video Stream 257 at two different frame rates: active frame rate $F_1$ or default frame rate $F_0$. Image Buffer Module 255 may transmit/forward the contents of the circular image buffer at active frame rate $F_1$ when Threshold Module 245 has determined that it is appropriate to do so. If Threshold Module 245 determines that the frame rate should be $F_1$, that is, users of the video surveillance control system 200 should receive an active real-time video feed from Electro-Optical Camera 220 at the active frame rate $F_1$, Threshold Module 245 can signal Image Buffer Module 255 to release images from its circular image buffer at the active frame rate $F_1$ by setting Active Flag 247 to a value of "true." When Active Flag 247 is set to a value of "true," Image Buffer Module 255 may forward the contents of its circular image buffer to Image Encoder Module 260 via Video Stream 257 at active frame rate $F_1$, and may continue doing so until Threshold Module 245 sets Active Flag 247 to "false." When Active Flag 247 is set to "false," Image Buffer Module 255 may forward the contents of its circular image buffer to Image Encoder Module 260 via Video Stream 257 at the default frame rate $F_0$.

When Active Flag 247 is set to "false" and the frame rate is $F_0$, Image Buffer Module 255 may select one frame from the circular image buffer to forward to Image Encoder Module 260 via Video Stream 257. The selected frame can be the most recently received image, the least recently received image, or any other image in the circular buffer, depending on design factors and conclusions reached by Analytics Module 240.

Image Encoder Module 260 may receive a Video Stream 257 from Image Buffer Module 255 and may encode the received images according to the H.264 format, or any other comparable video format known in the art, and may then either record the encoded images in Storage Device 270 or transmit the encoded images as Video Stream 263 via Network 265 to a receiver such as an interested user. Storage Device 270 may correspond to Storage Device 170 and may include a DVR or NVR.

Network Gatekeeper 227 may function as a management tool for multimedia networks. A single gatekeeper may control interactions for each module that comprises a video and/or controller endpoint, multipoint control units (MCUs), Extensible Messaging and Presence Protocol ("XMPP"), and gateways within a particular domain. Although the gatekeeper may be an optional component, when it is included, it can becomes a central administrative entity. Depending on the demands of the specific network, Network Gatekeeper 227 can oversee authentication, authorization, controller and analytic directory and analytic exchange services, as well as analytic routing to video controller endpoints. Other functions of Network Gatekeeper 227 may include monitoring a network for load balancing and real-time network management applications, intrusion detection and prevention, and providing interfaces to legacy systems. Network Gatekeeper 227 may comprise a hardware device or a software application. Network Gatekeeper 227 may be connected to any device or software module that transmits and/or receives information over a network, including Control/View Terminal 210, Depth Sensor 215, Electro-Optical Camera 220, Network 265, and any software module executing within Software. Framework 205.

Analytics

Figure 4:
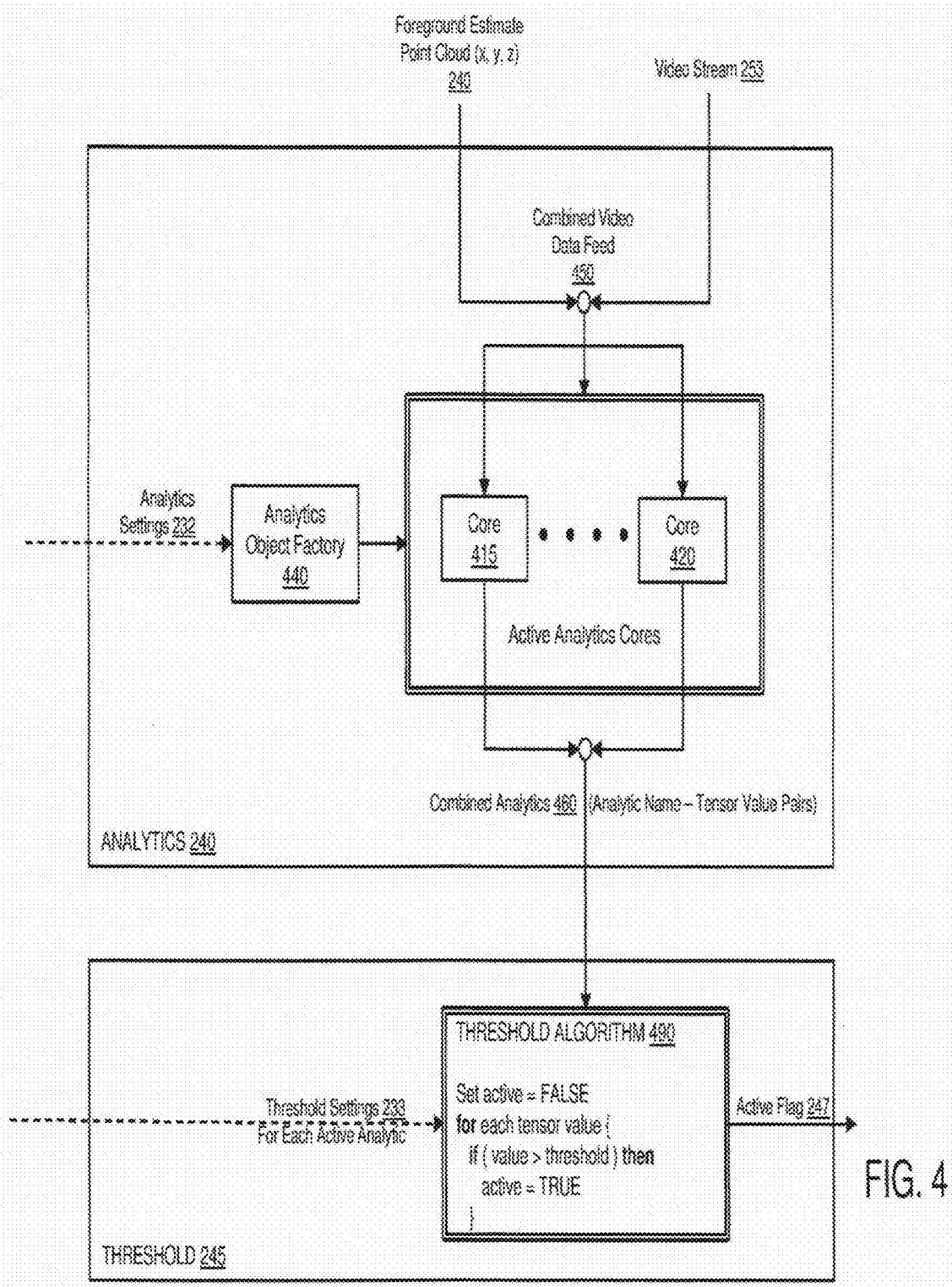
FIG. 4 illustrates an exemplary combined block diagram and flow chart of an analytics module and a threshold module for processing point clouds and images received from depth sensors and electro-optical cameras, according to an embodiment of the present disclosure.

FIG. 4 illustrates an exemplary combined block diagram and flow chart of an Analytics Module 240 and a Threshold Module 245 for processing point clouds, depth maps, and video streams received from depth sensors and electro-optical cameras, according to an embodiment of a video surveillance control system.

Analytics Module 240 comprises a processing module that, together with Threshold Module 245, can determine when to trigger transmission of a video stream, such as Video Stream 253, over a Network 265 in order to provide real-time imagery of Physical Space 280 obtained from Electro-Optical Camera 220 only when such real-time imagery is meaningful or important or desired, as determined by various optionally user-selectable analytics core modules that Analytics Module 240 may employ, together with configuration parameters (such as those stored in Settings 230) for those analytics core modules.

At initialization, Analytics Module 240 may receive Analytics Settings 232 from Settings Module 230. Analytics Settings 232 may identify specific analytics core modules, such as Core 415 and Core 420, to be activated for a given surveillance objective. Analytics Settings 232 may also include various configuration parameters associated with each analytics core module. Analytics Module 240 may also receive Foreground Estimate Point Cloud 240 from Foreground Estimation Module 235, and may also receive Video Stream 253 from Image Decoder Module 250. As shown in FIG. 4, Foreground Estimate Point Cloud 240 and Video Stream 253 are combined together to form Combined Video Data-Feed 450. This does not mean, however, that data from Foreground Estimate Point Cloud 240 and Video Stream 253 are actually merged. It rather indicates that both data sources (240 and 253) may be provided separately to each active analytics core module (e.g., Core 415, Core 420), that has been selected and configured to operate within Analytics Module 240.

Analytics Module 240 may include an Analytics Object Factory 440, which may select and load specific analytics core modules based on user preferences and configuration parameters for execution. The analytics core modules, such as Core 415 and Core 420, may be implemented as "plug-ins." Each analytics core module may comprise a software object that is designed to process data, for example, data from Foreground Estimate Point Cloud 240 or Video Stream 253. If a requested analytics core module is not available within the video surveillance control system 200, Analytics Module 240 may communicate over Network 265 (or Power Over Ethernet 121 and the like) to access a server on which the requested analytics, core module may be found. Analytics Module 240 may then access the requested analytics core module, retrieve it from the appropriate server, and load it into memory of Processor 105 (including the appropriate CPU and/or GPU) for subsequent execution within Analytics Module 240.

In addition to loading a requested analytics core module from an analytics repository (not shown) within video surveillance control system 200 or from an external server, Analytics Object Factory 440 may also create and load an analytics core module dynamically, using combinations of user-supplied input and existing analytics core modules to customize a given analytics core module for a given situation.

One example of an analytics core module is an object recognizer. An object recognizer analytic may use a "k means" algorithm to process a point cloud (such as Foreground Estimate Point Cloud 240) to produce a new point cloud containing an object label associated with each point. That is, the object recognizer analytic may produce per-point object labels, where each point includes a label identifying an object to which it belongs and optionally containing a statistical value associated with the probability that the point is part of the identified object.

Another example of an analytics core module is a "Hu moment" analytic. A Hu moment (specifically a 2nd-order Hu moment) algorithm or analytic can be used to calculate the size of a given object in a point cloud. A Hu moment analytic may also be used to calculate a centroid of an object (the center of its mass, essentially).

Another example of an analytics core module is an object identifier, for example, to recognize a face, a person, a female, a trash can, a backpack, and the like. A face recognition analytics core module may use a convolutional neural network software to creates a unique identifier (similar to a hash value) associated with each identified face.

For example, Analytics Module 240 may receive raw Video Stream 253 in order to perform facial recognition algorithms to assign unique identifiers to each recognized face.

Yet another example of an analytic may build on object identification to determine contextual information about objects, such as whether a given object (say, a backpack) is associated with a person or simply sitting unattended on a sidewalk or a bench, for example. In this kind of situation, an analytic core module may determine that a lone backpack has been identified. At this point, the analytic core module may generate an output indicating a high probability of a suspicious object. That output may be processed by the Threshold Module 245 to set the Active Flag 247 to "true," and optionally to send a notification message to a specific user, for example a law enforcement user, about the suspicious object. At the same time, the analytic core module may ask Analytics Object Factory 440 to search for anew analytic core module that may assist in further processing of suspicious lone backpacks. If such an analytic core module is available, it may be loaded into Memory 109 of Processor 105 and executed dynamically.

Some analytic core modules may be customized dynamically by configuration parameters. For example, if an object-identification analytic is able to recognize trash cans, one customization may involve parameters that help determine whether a given trash can belongs to a city agency.

Some analytic core modules may use deep learning techniques to determine various actions that objects may be performing in an environment during a given time sequence. Using neural net modules that have been trained separately, these analytic core modules may identify a probability associated with such object actions as "person walking," "person running," and the like, including the location in Physical Space 280 of each object associated with the identified actions, so the object can be tracked from one image to the next. Such deep learning analytic core modules may use a GAFFE software library for object processing.

Other analytic core modules may process an incoming Video Stream 253 to detect and identify faces (again, where each identification is associated with an accuracy probability or an equivalent confidence measurement). Such face detection analytic core modules may use an OpenCV software library for face detection. Face detection analytic core modules may be supplemented by analytic core modules that locate each face in the Physical Space 280. That is, an analytic core module may define a bounding rectangle around which a given face is located. Another analytic core module may use face location in order to track the face from one image to the next.

Still other analytic core modules may recognize gestures to interact with the video surveillance control system 200. Gesture tracking may include detecting and tracking objects and human body parts placed within a field of view of Depth Sensor 215 or Electro-Optical Camera 220. A gesture tracking analytic core module may capture gesture data one video frame at a time. Other analytic core modules may use a software protocol such as JavaScript API to access gesture data, similar to Leap Motion's motion tracking software. In this architecture, a gesture tracking analytic core module may send tracking information through a communication channel as a formatted message. The software protocol (e.g., JavaScript API) may then receive the message and parse it into gesture objects. For example, a gesture application using the JavaScript API may display several properties from key tracking data objects in the API, including (1) Frame, which may contain a set of objects or body parts and related pointable tracking data; (2) Object or Body Part, which may contain tracking data for a detected object or body part; (3) Pointable, which may contain tracking data for a detected sub-object or tool; and (4) Gesture, which may represent a recognized gesture. Together a gesture analytic core module may recognize a raised hand within a frame, an aggressive motion between two detected bodies, an object moved from a secure location, a hand motion to record an entire event forward or backward.

Analytic core modules may be invoked serially and/or in parallel. Analytic core modules may execute at predefined intervals, such as 30 times per second. They may also be executed based on event interrupts, such as the arrival of a new Foreground Estimate Point Cloud 240 or a new frame of video in Video Stream 253.

Each analytic core module (such as Core 415 and Core 420) may produce a data output in the form of a tensor, including, for example, a series of object identifiers and probabilities associated with the identification of each object. The outputs of each analytic core module is concatenated together and transmitted as Combined Analytics 460 to the Threshold Module 245. Combined Analytics 460 may comprise an analytic name or identifier (corresponding to a specific analytic core module) together with the tensor value pairs generated by the analytic core module. The tensor values may be dimensionally reduced and translation-rotation invariant.

Threshold Module 245 compares the values created by the analytics core modules to specific configuration parameters set by a user (Threshold Settings 233), to determine whether to set Active Flag 247 to "true" and thereby transmit Video Stream 253 to users at the active frame rate $F_1$. Threshold Module 245 may receive the Combined Analytics 460 from Analytics Module 240. Using on the tensor value pairs in Combined Analytics 460, combined with Threshold Settings 233 for each active analytic, Threshold Module 245 may invoke Threshold Algorithm 490 to analyze each tensor value. If a tensor value is greater than a user-configurable threshold, the Active Flag 247 will be set to "true." Otherwise, if nothing in the Foreground Estimate Point Cloud 240 or the Video Stream 253 has caused Analytics Module 240 to identify anything unusual or important or desired, the tensor values output from Analytics Module 240 will fall below their respective thresholds. Under these conditions, Active Flag 247 will be set to "false" and Video Stream 253 will be transmitted to users at the default frame rate $F_0$.

Computing Device

Figure 5:
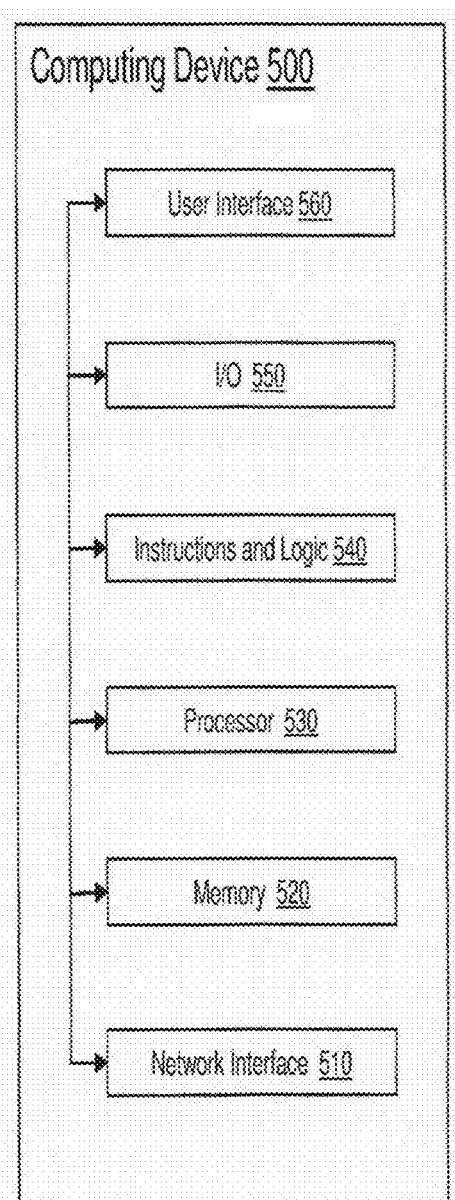
FIG. 5 is a block diagram of an exemplary embodiment of a computing device, in accordance with the present disclosure.

FIG. 5 is a block diagram of an exemplary embodiment of a Computing Device 500 in accordance with the present invention, which in certain operative embodiments can comprise, for example, Processor 105. Computing Device 500 can comprise any of numerous components, such as for example, one or more Network Interfaces 510, one or more Memories 520, one or more Processors 530, program Instructions and Logic 540, one or more Input/Output ("I/O") Devices 550, and one or more User Interfaces 560 that may be coupled to the I/O Device(s) 550, etc.

Computing Device 500 may comprise any device known in the art that is capable of processing data and/or information, such as any general purpose and/or special purpose computer, a programmed microprocessor or microcontroller and/or peripheral integrated circuit elements, a high speed graphics processing unit, an ASIC or other integrated circuit, a hardware electronic logic circuit such as a discrete element circuit, and/or a programmable logic device such as a PLD, PLA, FPGA, or PAL, or the like, etc. In general, any device on which a finite state machine resides that is capable of implementing at least a portion of the methods, structures, API, and/or interfaces described herein may comprise Computing Device 500. Such a Computing Device 500 can comprise components such as one or more Network Interfaces 510, one or more Processors 530, one or more Memories 520 containing Instructions and Logic 540, one or more Input/Output (I/O) Devices 550, and one or more User Interfaces 560 coupled to the I/O Devices 550, etc.

Memory 520 can be any type of apparatus known in the art that is capable of storing analog or digital information, such as instructions and/or data. Examples include a non-volatile memory, volatile memory, Random Access Memory, RAM, Read Only Memory, ROM, flash memory, magnetic media, hard disk, solid state drive, floppy disk, magnetic tape, optical media, optical disk, compact disk, CD, digital versatile disk, DVD, and/or RAID array, etc. The memory device can be coupled to a processor and/or can store instructions adapted to be executed by processor, such as according to an embodiment disclosed herein.

Input/Output (I/O) Device 550 may comprise any sensory-oriented input and/or output device known in the art, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, vibrator, tactile simulator, and/or tactile pad, optionally including a communications port for communication with other components in Computing Device 500.

Instructions and Logic 540 may comprise directions adapted to cause a machine, such as Computing Device 500, to perform one or more particular activities, operations, or functions. The directions, which can sometimes comprise an entity called a "kernel", "operating system", "program", "application", "utility", "subroutine", "script", "macro", "file", "project", "module", "library", "class", "object", or "Application Programming Interface," etc., can be, embodied as machine code, source code, object code, compiled code, assembled code, interpretable code, and/or executable code, etc., in hardware, firmware, and/or software. Instructions and Logic 540 may reside in Processor 530 and/or Memory 520.

Network Interface 510 may comprise any device, system, or subsystem capable of coupling an information device to a network. For example, Network Interface 510 can comprise a telephone, cellular phone, cellular modem, telephone data modem, fax modem, wireless transceiver, Ethernet circuit, cable modem, digital subscriber line interface, bridge, hub, router, or other similar device.

Processor 530 may comprise a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can comprise a general-purpose computing device, including a microcontroller and/or a microprocessor, such as a Tegra K1/X1 processor from NVIDIA, or equivalent (for example, a Jetson TK1 or Jetson TX1). In certain embodiments, the processor can be dedicated purpose device, such as an Application Specific Integrated Circuit (ASIC), a high speed Graphics Processing Unit (GPU) or a Field Programmable Gate Array (FPGA) that has been designed to implement in its hardware and/or firmware at least a part of an embodiment disclosed herein.

User Interface 560 may comprise any device and/or means for rendering information to a user and/or requesting information from the user. User Interface 560 may include, for example, at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, auto-sizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

The present disclosure can be realized in hardware, software, or a combination of hardware and software. The invention can be realized in a centralized fashion in one computer system, or in a distributed fashion where different elements are spread across several computer systems. Any kind of computer system or other apparatus adapted for carrying out the methods described herein is suitable. A typical combination of hardware and software can be a general-purpose computer system with a computer program that, when being loaded and executed, controls the computer system such that it carries out the methods described herein.

Calibration and Validation

An embodiment of the invention can use one camera or depth sensor (i.e., Electro-Optical Camera 220 and/or Depth Sensor 215) to calibrate and/or validate the other one. This process can help to improve and/or ensure reliable accuracy of both devices, for example, to protect an embodiment from potential user abuses that could fool the system, such as pointing Electro-Optical Camera 220 in a different direction from Depth Sensor 215, thus preventing Electro-Optical Camera 220 from ever receiving the imagery it is meant to record. A validation can also ensure that Depth Sensor 215 is pointed at the desired physical environment. Validation can occur during the initial set-up and calibration of an embodiment.

Embodiments of the invention can also create a point of validation between Electro-Optical Camera 220 and/or Depth Sensor 215 to create a corroborating statistic that goes back and forth between the two devices to ensure both are looking at the same environment, or a subset of the same environment. Embodiments of the invention can accomplish this validation by either putting a known object in the image that has a certain pattern on it, or by calibrating the devices relative to each other using statistical methods to independently identify a series of points belonging to agreed-upon objects. Once an embodiment has matched enough of these key validation points, the embodiment can calculate the position of the sensors/cameras relative to each other. During this corroboration process, if there is something wrong with a matched point, an embodiment can send an error message to a user indicating that the devices are not aligned. Embodiments of the invention can also use Depth Sensor 215 to construct a differential model of Physical Space 280 (similar to Background Model 231) and project that model onto an image received from Electro-Optical Camera 220 to ensure that the two systems (Electro-Optical Camera 220 and Depth Sensor 215) are aligned correctly.

Embodiments of the invention may also project a point of light to a location within the Physical Space 280. The point of light may be in the visible range of light, or it may be infrared or in some other range of the spectrum that is not visible to humans but is visible to a sensor. The point of light may then be viewed and captured by Electro-Optical Camera 220 and certain types of Depth Sensor 215 (for example a Depth Camera 160, and/or a Stereo Vision Camera 165). This method would allow embodiments of the invention to dynamically re-calibrate and re-validate the video surveillance control system 200. Validating both the environment and an embodiments projection of a point within the environment would help to prevent anyone from faking the environment.

3D Monitoring of Sensors Physical Location in a Reduced Bandwidth Platform

Various environmental sensors can be aggregated wired or wirelessly to a controller that has a three-dimensional (3D) static position for each environmental sensor. Various controllers can be aggregated to build a three-dimensional map of an integrated or disparate sensor array. For example, a sensor from a manufacturer can be integrated into an array of sensors from various different sensor manufacturers, the array of sensors is integrated to a controller or a system of controllers. Each sensor provides an operational threshold; for example, a temperature sensor operates between −X to +X degrees, but for operational purposes the threshold is between +X to +Xn degree, whereas the abnormal. threshold is between −Y to Yn degrees. A static three-dimensional sensor map is produced during the initial setup. During normal operation a static three-dimensional database for daily operation is held within the controller's static database. The controller transmits zero bandwidth as a null indicator that all sensors in the three-dimensional space are operating within normal parameters. (Note: Null or Heartbeat transmission). Should the temperature move into the abnormal threshold range, the received temperature transmission to the controller would be updated into the abnormal three-dimensional database controller and retransmitted by the controller to single or multiple locations. Point Cloud or video/sound surveillance information can be transmitted to proximity, visually or auditory validate the sensors position and status.

Methodology for Positioning Sensors in
Three-Dimensional Space

Figure 6:
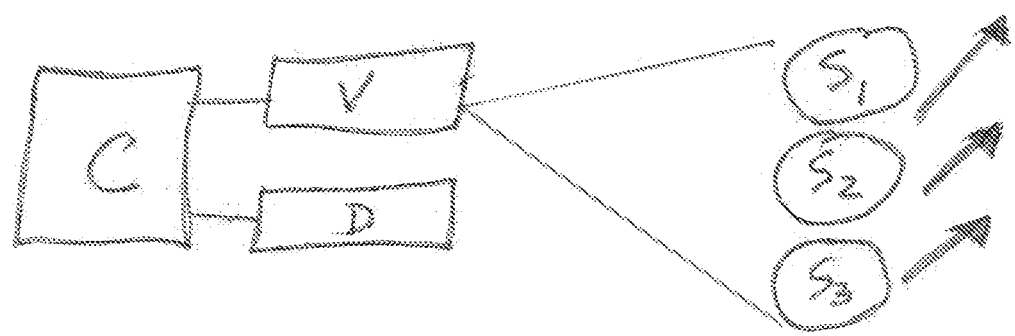
FIG. 6 illustrate a sensor system of another embodiment.

There are several methods to locate, position, detect, or identify an object in three-dimensional space including but not limited to MEMS position tracking, depth sensing, radar, LiDAR, thermal, sound, video, video tracking and other methodologies know to the arts. The above mentioned methodologies to locate, position, detect, or identify an object in three-dimensional space including but not limited to MEMS position tracking, depth sensing, radar, LiDAR, thermal, sound, video, video tracking and other methodologies known to the arts also provide topological, information individually and in combination with other sensors to develop a topological map of sensor(s) within and/or among a controller. One illustration is shown in FIG. 6. Controller+ 2D/3D Sensor+Video Surveillance wired/wirelessly connected to Sensor1 @x,y,z, Sensor2 @x,y,z, Sensor3 @x,y,z. Where x,y,z are three-dimensional characteristics.

Mesh networks and mesh network nodes are known to the arts to provide a single wired data connection to a single node and that access point is shared with the other nodes wirelessly. However, in a mesh network, without hand and eye identification, provides no three-dimensional position. Also, known to the arts, mesh networks also have 'backhaul'problems with bandwidth from various mesh network nodes jamming a single point of wired connection. Adding additional wired nodes alleviates the backhaul problem but may not alleviate the bandwidth problem. The purpose of the present invention lowers the bandwidth to zero while sensor activity is at a null state.

Where labVIEW 3D Sensor mapping Express VI is an application to draw a three-dimensional place for sensor(s) within a drawing as an expression of reality, the present invention is a physical location for sensor(s) in a physical space.

This disclosure identifies three modes for sensor identification; (1) 3D Sensing, (2) Object Identification, (3) wired/wireless discovery. (1) 3D sensing, the controller can learn to add/modify/delete the status of a sensor through 3D sensing and analytics programmed to accept the addition/modification/deletion of a sensor. (2) Object Identification, presenting the sensor to the video/three-dimensional device for smart object detection. (3) Wired/Wireless discovery while the controller is in detection mode and the sensor is transmitting in PAIR mode, similar to Bluetooth discovery settings where the controller point is in discovery mode and the device is in PAIR mode a sync characteristic is matched and the controller accepts the addition/modification/deletion of the device to the controller.

A BLOCKCHAIN Solution to Transact and Mine
Cryptocurrencies in a 3D Video Surveillance and
Environmental Monitoring System Background, most video surveillance stored video and analytics are of little use in the moment, and therefore inherently inefficient, since it is only possible to record data via videos, and store video archives. They are therefore backward-looking and dumb in that they cannot and are completely unable to react to a situation when it is actually happening in real time.

Computer vision technologies have many false positives and are expensive to develop and require the additional expense of requiring substantial computing resources to run. Only a few very expensive B2B solutions have computer vision and video content analysis implemented as a part of their technology stack. As a consequence, their technologies are still very early-stage compared to the possibilities offered by the vast potential of 3D, Stereo Video Systems, Depth sensing paired with GPU controllers and blockchain, transferring IoT smart object contracts through a neural network. The current EDGE system distributes a system comprising a Video Camera and one or more depth sensor, structure sensor, stereo cameras, or other physical sensing, a controller (NVIDIA Jetson TX2 GPU) capable of various I/O ports for network, USB, HDMI, PCI-Ex4, Ethernet, Wireless module, storage, onboard expansion, GPIO, I2C, I2S, SPI, TTL UART, and other I/O expansion.

The present disclosure is the first decentralized surveillance system. The present disclosure makes video surveillance smart, giving brains to cameras through enhanced 3D detection, object detection and real-time 3D/Stereo video analysis. These features allow cameras to understand the situation and respond to it, offering much better security to all the customers.

Computer structured vision technology with blockchain under a decentralized network of GPU controllers makes the invention available for all analog and digital video cameras currently in use to be retrofitted using the present invention. The benefit from a blockchain mining perspective is that miners can use the same Graphic Processing Units (GPU's) that they use to mine Ether*. The present inventions technological core is the absolute respect for privacy, and the utilization of the features of convolutional neural networks to split the tasks reinforces this commitment. As a result, sensitive data is always processed in a completely trusted environment, and all images not subject to recovery are passed to the decentralized network. This amounts up to 80% of the total amount of calculations performed.

The present disclosure plans to fill this niche by offering a product with broad functionality linking physical roadways and manned or unmanned autonomous vehicles.

Figure 7:
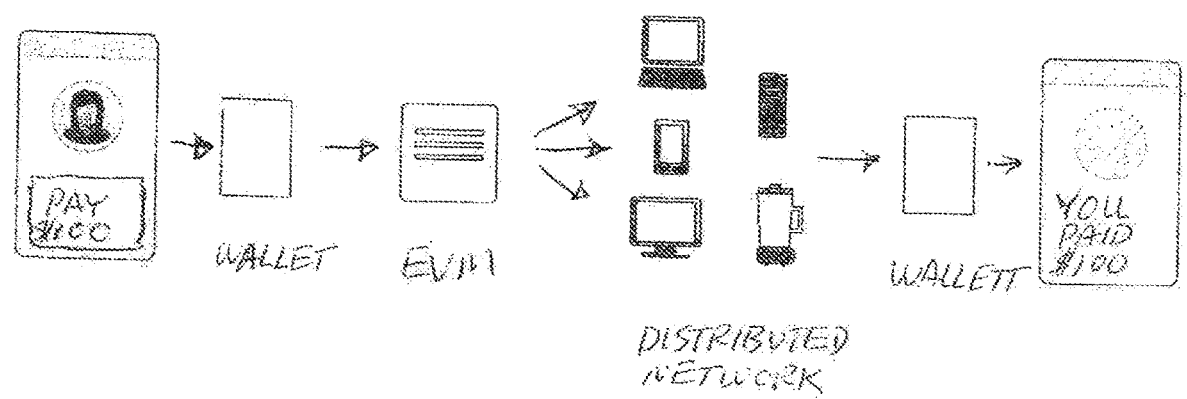
FIG. 7 illustrates Ethereum transactions.

Reduced Bandwidth Based Traffic Management
System and, Distributed Sensor and Applications
Between Drivers in Vehicles, and Roadways
Multi-Level Products and Services Providers Most Ethereum transactions, such as shown in FIG. 7, have not been classified as moving transactions, prior art describes a static transaction rather than, in the present invention, a moving transaction across multiple transaction terminals, i.e., Driver enters a Smart Highway (The Present Invention) and a Smart Contract (Ethereum, Bitcoin, and others) is established, a transaction to the Smart Contract is identified as, for example, TOLL PAYMENT, an automatic transaction, then, the DRIVER accesses current road conditions through a distributed application on either mobile device or smart vehicle equipped with transactional devices or computing system, and receives a look ahead view of vehicle backups, accidents, or other traffic conditions, would be another transaction to the Smart Contract. Another transaction to the Smart Contract, an autonomous vehicle or the driver may access entertainment, and download or stream it to the device or vehicle, mobile or computing device, or order food to be picked up at a way station ahead of the current position of the vehicle. Vitalik Buterin, Founder and Inventor of Ethereum, ". . . taking Bitcoin and Ethereum, or Crypto-Economics, a combination of crypto-graphic-algorithms things like hashing and digital signatures and economic incentives (Bitcoin) and use them to create decentralized networks with memory, decentralized databases, for other applications." The present disclosure is one of those other things. The background sensor array system or Smart Beacon as I'm calling it, has transaction and traffic monitoring hardware built into lamp poles for example, a server system, like an Ethereum Virtual Machine (EVM), one or more GPU/CPU, Memory, Wired/Wireless Communications, 3D rendering of the road, vehicles, background, sensor objects and road conditions, Video Cameras, Environmental Sensors.

https://en.wikipedia.org/wild/Environmental monitoring

Operating System, Device Drivers, Middleware, Utility Software, Shells, Analytics, Algorithms, Graphic and Text based system software. Smart Beacons are distributed throughout a campus, roadway, area of interest, and integrated wired or wirelessly to one or all of various Law Enforcement, Banks, First Responders, Entertainment providers, hard and soft goods merchants and other services important to travelers in vehicles. Environmental sensor array, audio/video surveillance, lighting and product'and service providers, including law enforcement monitor the activity of the roadway and the driver throughout the entirety of the point to point course have a vast need for bandwidth.

Currently video surveillance systems used for traffic monitoring is limited by bandwidth and quality of information. Evidence of this are traffic jams, backups, accidents, hazardous road conditions, motorist errors, and conditions caused by maintenance of the roads and law enforcement. The link between the motorist and road conditions is minimal at best worldwide. The present disclosure describes a distributed application system and controller under operating software containing analytics for a video and sensor system to provide an exchange of information and data between municipalities and motorists using currently available driver, driver assisted, automated driver motor vehicles. Additionally a distributed application system for Credit and Debit transactions is disclosed to provide the exchange of applications and financial transactions like toll payment, road condition alerts, entertainment and refreshment purchases, ahead viewing of road conditions, hazardous condition alerts, emergency services requested and provided based on structural identity an unique ID, sensor based controllers positioned intermittently along a roadway that may or may not be attached to traffic lights, light poles, overhead signage or other equipment communicating between motor vehicles, drivers, law enforcement, municipalities and other services authorized to communicate through the system.

Figure 8:
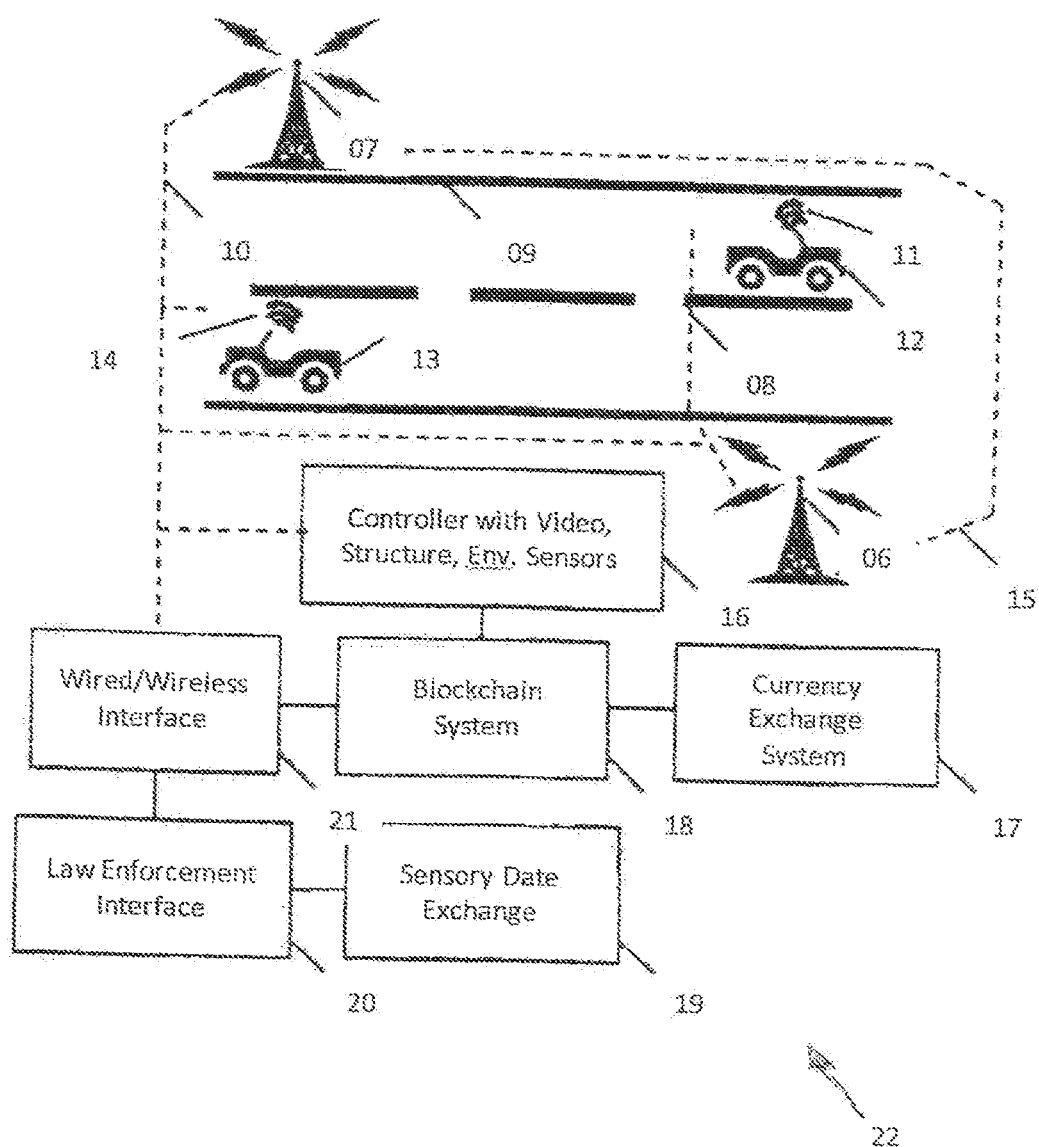
FIG. 8 illustrates a vehicle system.

A distributed application system (Smart Contract: Small pieces of code distributed on the blockchain, executed in a decentralized platform) and sensor management system described combining structure sensing, environmental sensors and wireless links to automobiles and Autonomous Vehicles (AAV) where motorists are connected to a distributed application system library. AAV motorists are debited for road use and credited for safe and secure travel. AAV motorists are provided with data links for current and future road conditions according to this disclosure Referring to FIG. 8, there is shown:

Smart Beacon 6. A free-standing device connected to AC/DC power, Wire/Wireless connection: with Hotspot Capability and IoT narrow banding RF, GPU/CPU Controller, Environmental Sensors, Audio/Acoustic/Video Surveillance Equipment, 3D Structural Sensing, Smart Beacon 7. All Smart Beacons take a sensory snapshot during initial setup; topological, environmental sensor condition, structural topology 360-degree view, connection to other Smart Beacons, ACK/NACK between support communication services including wired and wireless providers, Smart Beacon initiation as a mining point for crypto currency, credit/debit ATM transaction point, emergency response beacon with location. Structural validation of the sensory network at 06, i.e., each Smart Beacon has a physical, sensory, operational status of itself and the Smart Beacons around it. The initial setup sets the basis for bandwidth reduction for the entire system as described in this disclosure of an added sensory platform, transaction platform, and Smart Beacon platform.

Smart Beacon 8 identified a vehicle. A vehicle enters into view of the Smart Beacon and various algorithms may or may not do the following:

Minimal, the vehicle complies with all legal standards for free access to free services Identification of the Vehicle by Audio/Video.

Number 2, and/or a sensor detection of the vehicle's environmental status, and, No. 2, 3 and/or initiate illumination, turn lights on, No. 2, 3, 4 and/or Receive a request for transaction of a credit or debit for products and services, and, 1. No.2,3,4,5, and/or guide vehicle to the side road and open video/audio communications for emergency services, and,
2. No.2,3,4,5,6 and/or include other vehicles for all of the aforementioned attributes in addition to algorithms to detect vehicle to vehicle issues including but not limited to accidents, vehicle to vehicle communication, repairs, assistance from one vehicle to another.
3. No,2,3,4,5,6,7 and/or Detailed road conditions before, during or after the vehicle(s) enter the Smart Beacon space.

Road space 9 monitored by Smart Beacon(s).

Smart Beacon 10 Capabilities:

No. 16, No. 17, No. 18, No. 19, No. 20, No. 21, No. 22

Driver Identity 11:

Driver Initiates communication on Smart Beacon System; Driver is contacted on Smart Beacon System.

Vehicle 12 equals Driver w/Device, Driver Assisted Vehicle, Autonomous Vehicle, identified by the Smart Beacon System by visual, sensor, ID, Request for Service.

Vehicle 13 alone or in the same space being monitored by the Smart Beacon, where one or more vehicle have been tagged for identity by a Smart Beacon and passed as an electronic ID under the capabilities of the Smart Beacon to other Smart Beacons.

Driver 14 as identified in Item 11, including the driver to driver communication, or vehicle to vehicle communication initiated by the driver in each separate vehicle. Also, the following features:

1. Double redundant connection for RF/RADAR/LASERS emitted by other vehicles that may cause a read failure between the vehicles radar and lasers, the present invention provides a dimensional 'sanity check' between the vehicle the BEACON and other vehicles.
2. Evidentiary data collected by the Beacon and triggered by an algorithm or analytic, or a signal sent by each or any of the Autonomous Vehicles.

3. Crowd navigation becomes exponentially enhanced with the present invention, where each beacon is monitoring evidentiary information itself and among other beacons, therefore a person walking could easily pass from one beacon to another, leave the scene or enter at a different point and the hashing tag ascribed to that particular individual is validated by the sensor array within each beacon.
4. Artificial Intelligence (AI) corrected algorithms and analytics as time progresses and the beacon(s) learn from their environment become invaluable to the Autonomous Vehicle community.

Smart Beacon 15 to Smart Beacon Communication for asset tracking, vehicle tracking, WiFi hotspot communication, Controller 16 with Video, Audio, Structure, EVM, Sensors, PA 20160210518

EVM 17, currency exchange system.

Blockchain 18 a Smart Beacon mesh network of Controllers linked not to a central server but rather to each other. Controllers in this network define and agree upon a shared state of data and adhere to certain constraints imposed upon this data. This shared state is simply a distributed state machine, with each "block" making a change to the current, known, shared state.

Sensory Data Exchange 19
Connectivity Platform
   Communication Integration
   Identity and Security
Middleware Platform
   Device Management
   Edge Systems and Gateway Management
   Notification Management Law Enforcement Interface 20, proprietary and exclusive channels for interfacing with the data from the beacons; direct connection may be prohibited except by professional certification.

Wired/Wireless Module Interface 21: instead of an ACK/NACK system, the present invention proposes a Offer/Take/Ack hierarchy of data ranging from (Low) Public, (High-Low) Condition Based, (Medium) Requested Data, (High) Data Demand: Data that must be accepted, (Highest) Critical broadcast that must be received and acknowledged.

The Beacon System 22, the entire system as described above. Morality and the Law.

The present beacon system measures conditions from a three-dimensional perspective and provides relevant data for that moment in time that an AV passes 'a' beacon and provides a continuous data stream throughout the path the AV proceeds through a beacon system.

Average jumbo jet has approximately 6.5-10 million lines of code, whereas the Autonomous Vehicle will have over 100 million lines of code. A validation or redundancy system must exist for the AV outside of it's capabilities.

Figure 9:
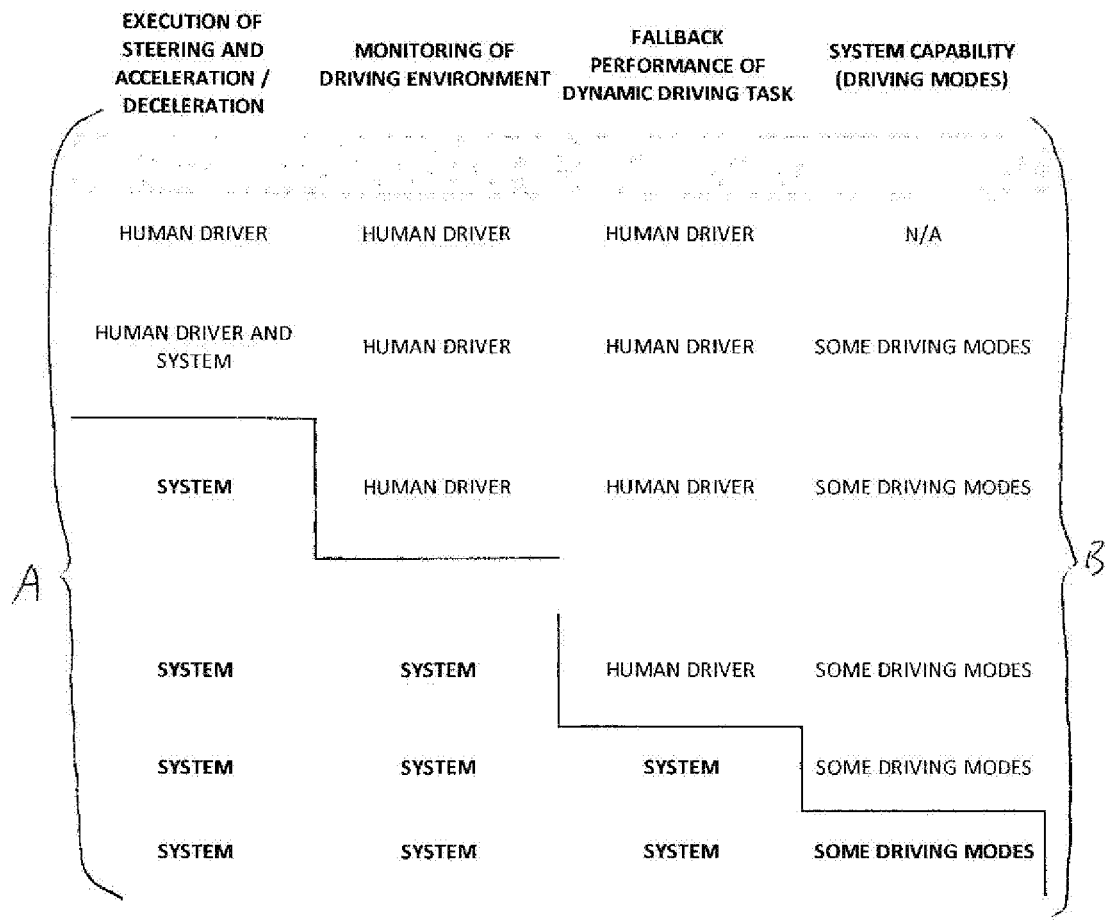
Figure 9:
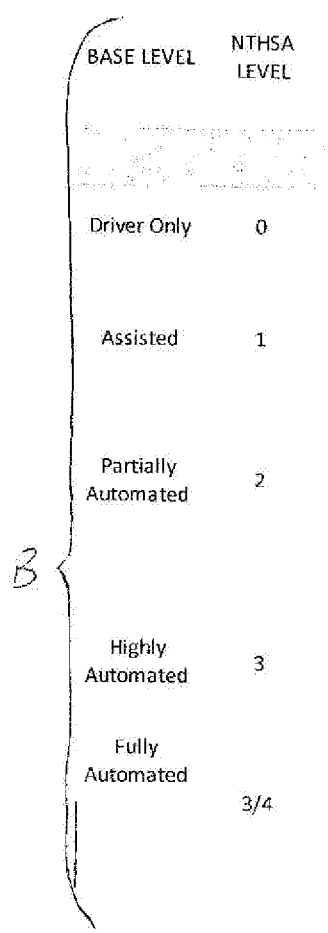

Automation levels of autonomous cars are shown in FIG. 9 and FIG. 10.

CONCLUSION

The above summaries of embodiments of the present disclosure have been provided to introduce certain concepts that are further described below in the Detailed Description. The summarized embodiments are not necessarily representative of the claimed subject matter, nor do they span the scope of features described in more detail below. They simply serve as an introduction to the subject matter of the various disclosures.

Although the present disclosure provides certain embodiments and applications, other embodiments apparent to those of ordinary skill in the art, including embodiments that do not provide all of the features and advantages set forth herein, are also within the scope of this disclosure.

The foregoing disclosure has been set forth merely to illustrate the disclosure and is not intended to be limiting. It will be appreciated that modifications, variations and additional embodiments are covered by the above teachings and within the purview of the appended claims without departing from the spirit and intended scope of the disclosure. Since modifications of the disclosed embodiments incorporating the spirit and substance of the disclosure may occur to persons skilled in the art, the disclosure should be construed to include everything within the scope of the appended claims and equivalents thereof.

The invention claimed is:
1. A video surveillance system comprising:
   a video camera configured to monitor a physical space;
   a three-dimensional (3D) depth sensor configured to measure the physical space;
   a control system in communication with the video camera and the 3D depth sensor, the control systet comprising a software application executable on a computing system, the control system configured to receive real-time video images of the physical space from the video camera, the control system further configured to record the real-time video images, the control system further configured to capture a 3D baseline measurement of the physical space from the 3D depth sensor and to capture 3D subsequent measurements of the physical space from the 3D depth sensor; and
   an analytic module operable with the control system, the analytic iodule configured to compare each 3D subsequent measurement to the 3D baseline measurement, each said 3D subsequent measurement comprising a data model indicative of new 3D objects in the physical space that were not present in the 3D baseline measurement, the analytic module further configured to trigger the control system to record the real-time video images whenever a statistical confidence measure associated with the data model exceeds a predetermined threshold value.

* * * * *